April 24, 1962     L. J. EDWARDS ET AL     3,031,259
ALKALI METAL TRIBOROHYDRIDES AND METHOD OF MAKING
Filed March 19, 1956
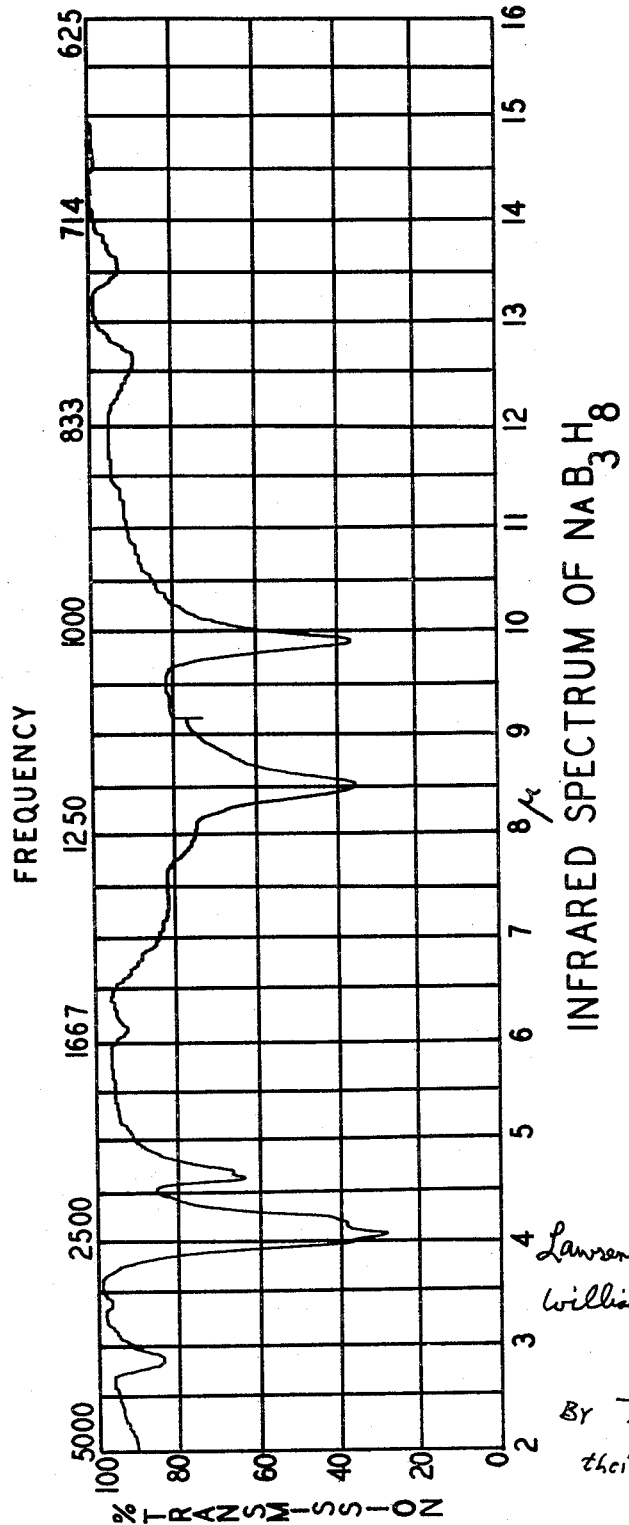
Lawrence J. Edwards
William V. Hough
INVENTORS
By Neal J. Mosely
their Attorney

United States Patent Office 3,031,259
Patented Apr. 24, 1962

---

3,031,259
ALKALI METAL TRIBOROHYDRIDES AND METHOD OF MAKING
Lawrence J. Edwards, Zelienople, and William V. Hough, Butler, Pa., assignors to Callery Chemical Company, Pittsburgh, Pa., a corporation of Pennsylvania
Filed Mar. 19, 1956, Ser. No. 572,265
7 Claims. (Cl. 23—14)

This invention relates to the triborohydrides of the alkali metals, $MB_3H_8$, where M is an alkali metal, and to methods of preparing the same.

It is one object of this invention to prepare novel polyborohydrides of the alkali metals.

Another object of this invention is to prepare new alkali metal borohydrides having a boron-metal ratio of 3:1 and hereinafter named triborohydrides.

Another object of this invention is to provide a process of preparing triborohydrides of the alkali metals by reaction of an alkali metal and diborane followed by extraction with a lower alkyl ether and recovery of the alkali metal triborohydride from the ether extract.

Other objects will become apparent from time to time throughout the specification and claims as hereinafter related.

In the accompanying drawing there is shown an infrared spectrum of the compound sodium triborohydride, $NaB_3H_8$.

This invention is based upon the discovery that an alkali metal such as sodium will react with diborane either as a dry reaction or in the presence of a solvent to produce a mixture of reaction products from which there may be extracted with diethyl ether a new compound of the formula $MB_3H_8$, where M is an alkali metal. When this reaction is carried out as a dry reaction the formation of the alkali metal triborohydride is very slow and may require several hundred hours. When the reaction is carried out in a polyether such as triethylene glycol dimethyl ether, $CH_3O(C_2H_4O)_3CH_3$, the reaction is quite rapid but produces the alkali metal triborohydride in a solvated form from which the solvent cannot be removed conveniently. When the reaction is carried out in a simple ether such as diethyl ether or dibutyl ether the reaction is more rapid than the dry reaction but is much slower than the reaction in a polyether.

In one experiment 6.84 mmol (mmol=millimols) of sodium in the form of sodium amalgam and 2 ml. of diethyl ether were placed in a reaction tube. Diborane was then condensed in the tube and the tube sealed and maintained at room temperature. The initial pressure of diborane in the tube was about 2 atmospheres which represented 12.16 mmol of diborane. This sealed tube was maintained at room temperature for 60 hours. At the end of that time the tube was opened and the ether evaporated from the solid products. The solids which remained were extracted with diethyl ether for an extended period of time and a solution obtained which upon evaporation yielded a small quantity of a white solid. The white solid which was thus obtained was identified as sodium triborohydride, $NaB_3H_8$, by analytical methods which will subsequently be described.

In another experiment sodium amalgam containing 6.68 mmol of sodium was charged in a sealed tube together with 2 ml. of dibutyl ether and 12.32 mmol of diborane. The sealed tube was maintained at room temperature at an initial diborane pressure of 2 atmospheres. At the end of 60 hours the tube was opened and the solvent evaporated. The solid which remained was extracted with diethyl ether and a small quantity of $NaB_3H_8$ obtained as in the preceding experiment.

In this reaction the sodium and diborane apparently react to form a sodium-diborane intermediate as follows:

$2Na + 2B_2H_6 = Na_2B_4H_{12}$. The sodium-diborane intermediate which is formed then apparently disproportionates to form sodium triborohydride, $NaB_3H_8$, and sodium borohydride, $NaBH_4$, as follows:

$$Na_2B_4H_{12} = NaBH_4 + NaB_3H_8$$

This reaction takes place at a much faster rate in polyether solutions such as triethylene glycol dimethyl ether but results in a solvated product from which it is very difficult to remove the solvent.

In another series of experiments sodium amalgam was reacted with diborane at atmospheric pressure in diethyl ether for various periods of time. In separate experiments it was found that at 4 hours reaction time a reaction product was formed which contained a small quantity of $NaB_3H_8$. Other experiments were run for periods of 16 hours, 44 hours and 150 hours, respectively, and in each case produced a reaction product containing sodium and diborane in a 1:1 molar ratio and from which $NaB_3H_8$ was extracted with diethyl ether. In still another experiment sodium amalgam and diborane were reacted in dibutyl ether for 64 hours and a reaction product was obtained containing 1 mol of sodium per mol of diborane reacted. From this reaction product $NaB_3H_8$ was extracted with diethyl ether.

In still another experiment a larger quantity of $NaB_3H_8$ was prepared as follows. A 2 liter flask was flushed with nitrogen and charged with 22 cc. of sodium amalgam containing 80 mmol of sodium, and 22 cc. of diethyl ether. The flask was frozen in a $-196°$ C. bath and 87 mmol of diborane condensed in the flask. The flask was sealed and allowed to warm to room temperature and the diborane therein was at substantially 1 atmosphere pressure. The flask was then turned on its side and stirred with a magnetic stirrer for 65 hours. At the end of this time the flask was opened and the solvent evaporated and the solid product scraped from the walls of the flask. There was considerable mechanical loss of product in removing the solids from the flask. The solids which were obtained were extracted with diethyl ether and 2.1 g. of $NaB_3H_8$ recovered. This represented a recovery of about 82% of the theoretical yield.

These and other experiments have shown that this reaction may be carried out in any simple lower alkyl ether or in a polyether or as a dry reaction depending upon the length of time allowed for the reaction. The reaction in simple ethers has been found to be operative over a range of temperatures from 0 to 50° C. As a dry reaction or in a completely inert solvent the reaction is operative at higher temperatures. It should be noted however that when the reaction is carried out in an ether 50° C. represents the approximate maximum temperature for the reaction since at higher temperatures the diborane cleaves the ethers which are used as solvents. This reaction has been carried out under a variety of pressures from atmospheric pressure up to very high pressures and at no point was there found any indication that the reaction is critically dependent upon the use of any particular range of pressures.

Other experiments show that this reaction is operative when sodium is reacted with diborane in other forms than as the sodium amalgam. For example, sodium may be reacted with diborane as liquid sodium or as a sodium dispersion in an inert solvent. When sodium is used as a dispersion or as a liquid reactant it is necessary to clean the sodium of all oxide prior to carrying out the reaction. If this precaution is not taken the oxide coating on the surface of the sodium will prevent the reaction from taking place at an appreciable rate.

Similarly when lithium amalgam is reacted in a sealed tube with diborane using diethyl ether as a solvent a reaction product is obtained which contains lithium and diborane in a 1:1 molar ratio. This reaction product is very soluble in ethers and disproportionates readily into $LiBH_4$ and $LiB_3H_8$.

The product prepared by this process and which is referred to as sodium triborohydride, $NaB_3H_8$, has been identified by standard analytical procedures. This product is a white solid which is thermally stable at temperatures up to 200° C. and higher. This material is very hygroscopic and hydrolyzes more slowly than sodium borohydride. This material is very soluble in solvents which are Lewis bases and particularly in simple ethers, water, polyethers, liquid ammonia, and amines. This product was analyzed for sodium, boron and hydrogen content as follows: Sample No. 1: sodium 15.5 mats./g. (mats.=milligram atoms), boron 48.6 mats./g. and hydrogen evolved upon complete hydrolysis 137 mmol/g. (mmol=millimols); sample No. 2: sodium 15.0 mats./g., boron 47.6 mats./g., and hydrogen evolved upon complete hydrolysis of sample 142 mmol/g. The theoretical analysis for $NaB_3H_8$ is sodium 15.7 mats./g., boron 47.2 mats./g. and hydrogen evolved upon complete hydrolysis of sample 141 mmol/g. The molecular weight of this compound was determined by coordination of the compound with diethyl ether. The ether was added to and removed from the known weight of the solid and an equilibrium pressure isotherm measured at 0° C. The molecular weight determined in this manner was 63.6 which corresponds to the theoretical molecular weight for $NaB_3H_8$. A unique X-ray diffraction pattern was obtained for this compound which is set forth in the following table.

In diethyl ether solution sodium triborohydride reduces nitrobenzene to azobenzene. The techniques used in the reductions above mentioned are standard techniques used for the carrying out of both inorganic and organic reductions with sodium borohydride.

While this invention has been described with particular emphasis upon the preparation, isolation and identification of sodium triborohydride it is obvious to those skilled in the art that this process is one which is equally applicable to the preparation of triborohydrides of the other alkali metals. An application directed to related subject matter was filed by us on March 19, 1957, and was given Serial No. 572,205, now Patent No. 2,955,911.

Having described this invention fully and completely it is to be understood that within the scope of the appended claims this application may be practiced otherwise than as specifically described.

Having thus fully and completely described this invention what is desired to be claimed and secured by Letters Patent of the United States is:

1. An alkali metal triborohydride, $MB_3H_8$, where M is an alkali metal.
2. Sodium triborohydride, $NaB_3H_8$.
3. A method of preparing an alkali metal triborohydride, $MB_3H_8$, where M is an alkali metal, which comprises reacting an alkali metal with diborane to produce a product having the empirical formula $MB_2H_6$, extracting said product with a simple lower dialkyl ether, and recovering the alkali metal triborohydride from ether solution.

Table I

| Line No. | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| d/0 | 8.8 | 6.2 | 4.4 | 3.96 | 3.61 | 2.94 | 2.78 | 2.57 | 2.38 | 2.18 | 2.01 | 1.95 | 1.79 | 1.65 | 1.56 | 0.882 | 0.851 |
| Intensity | VS | S | S | VS | M | M | VW | W | W | W | W | VW | W | VW | VW | W | W |

VS=very strong; S=strong; M=medium; W=weak; VW=very weak.

A unique infra-red spectrum for this material was obtained using a Perkin-Elmer, Model 21, double beam, infra-red spectrophotometer. The sample of material was pressed in a KBr pellet and the spectrum was obtained using a NaCl prism. The infra-red spectrum is shown in the attached drawing.

Sodium triborohydride is useful as a reducing agent both for inorganic and organic compounds. Due to the solubility of sodium triborohydride in a large number of solvents including several solvents in which sodium borohydride is insoluble this compound offers great promise as a specialty reducing agent. When sodium triborohydride is dissolved in water and added to an aqueous solution of silver nitrate a silver mirror is almost instantly deposited in the test tube, thus indicating the reduction of silver ion to metallic silver. Similarly, an aqueous solution of sodium triborohydride reduces cupric chloride to cuprous chloride. In another experiment an aqueous solution of sodium triborohydride was added to a solution of copper sulfate and a black precipitate was observed to form immediately. Sodium triborohydride has also been observed to reduce mercuric to mercurous ion and ferric to ferrous ion in aqueous solution. In another experiment a small quantity of sodium triborohydride was dissolved in acetone and produced a reduction of a substantial amount of the acetone to isopropanol.

4. A method according to claim 3 in which the ether used is diethyl ether.
5. A method according to claim 3 in which the alkali metal used is sodium amalgam.
6. A method according to claim 3 in which the alkali metal used is sodium dispersed in an inert liquid reaction medium.
7. A method according to claim 3 in which the alkali metal used is molten metallic sodium.

References Cited in the file of this patent
UNITED STATES PATENTS
2,545,633    Schlesinger et al. _____ Mar. 20, 1951

OTHER REFERENCES

Sodium Borohydride, Disodium Diborane, by J. S. Kasper et al., Journal of the American Chemical Society, vol. 71, July 1949, page 2583.

"Reactions of Diborane With Alkali Metal Hydrides and Their Addition Compounds, New Syntheses of Borohydrides, Sodium and Potassium Borohydrides," by H. I. Schlesinger et al., Journal of the American Chemical Society, vol. 75, pp. 199–204.

Hurd: "Chemistry of the Hydrides," N.Y., John Wiley and Sons, Inc., 1952, page 86.